UNITED STATES PATENT OFFICE.

SIMON BITTERMAN, OF CLAYTON, NEW MEXICO.

ARTIFICIAL TIMBER.

1,034,680.      Specification of Letters Patent.      Patented Aug. 6, 1912.

No Drawing.      Application filed July 7, 1908. Serial No. 442,308.

*To all whom it may concern:*

Be it known that I, SIMON BITTERMAN, a citizen of the United States, residing at Clayton, in the county of Union and State of New Mexico, have invented certain new and useful Improvements in Artificial Timber, of which the following is a specification.

This invention relates to a composition for building blocks, flooring, railroad ties, fence posts and the like, having as nearly as may be the properties of wood as regards lightness and capacity of working, and superior thereto in durability, heat insulating properties, and cheapness, being a much poorer conductor of heat and made very largely of a waste product.

In carrying out my invention, I take of the waste material—coke breeze 92% to 95% and cement 8% to 25%, according to the use to which the product is to be put, mix thoroughly to coat all the particles of breeze, and press in molds. In forming certain products such as railroad ties or fence posts, I may insert a wire reinforce; or wire fragments may be mixed therewith to add strength and tenacity.

My invention differs essentially from the artificial stone and building blocks commonly used in that the cement is employed in quantity sufficient only to lightly coat the coke particles and not to fill the pores thereof or the interspaces therebetween with a body of cement. The particles of coke breeze in the complete block are thus firmly bound together, but being themselves very porous and with minute intermediate spaces, the block is cellular, light and elastic as distinguished from the ordinary concrete building blocks which have the interspaces filled with a cement mass so as to produce a solid unyielding brittle and heavy block in the nature of stone.

I am aware that coke breeze has been employed with cement in the making of concrete, but where so used it has been employed in connection with or merely as a substitute for sand gravel and the like in the proportions usual in making concrete. In the practice of my invention, on the contrary, I use cement in such a comparatively small amount as to secure a product essentially different from such earlier compositions in those characteristics which go to make an ideal building material for houses, being easily handled, into which nails can be driven in placing framing and the like, which is cool in summer, warm in winter and sanitary at all times. In very wet climates, the walls formed by the blocks may advantageously be given a surface coat of cement or other plaster to close the pores and give a smooth finish.

Having thus fully disclosed the invention, what I claim as new and desire to protect by Letters Patent is, 1. A composition for building purposes, comprising coke breeze mixed with sufficient cement to coat the coke particles, but insufficient to completely fill the voids, and pressed into shape.

2. A composition for building purposes, comprising a granular filling material mixed with sufficient cement to coat the filler but insufficient to completely fill the voids, and pressed into molds.

3. A composition for building purposes, comprising coke breeze mixed with cement in the proportions of substantially 92% of the former and 8% of the latter, whereby to incompletely fill the voids and pressed into shape.

In testimony whereof I affix my signature in presence of two witnesses.

SIMON BITTERMAN.

Witnesses:
    F. P. TIERNEY,
    U. S. HAMMEL.

---

Copies of this patent may be obtained for five cents each, by addressing the "Commissioner of Patents, Washington, D. C."